Figure 14:
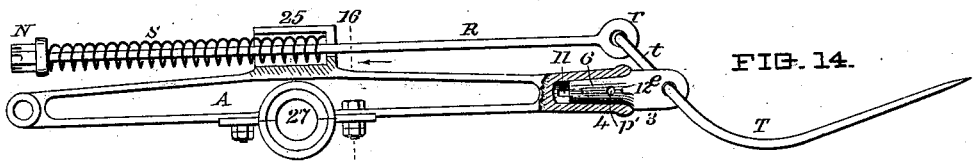

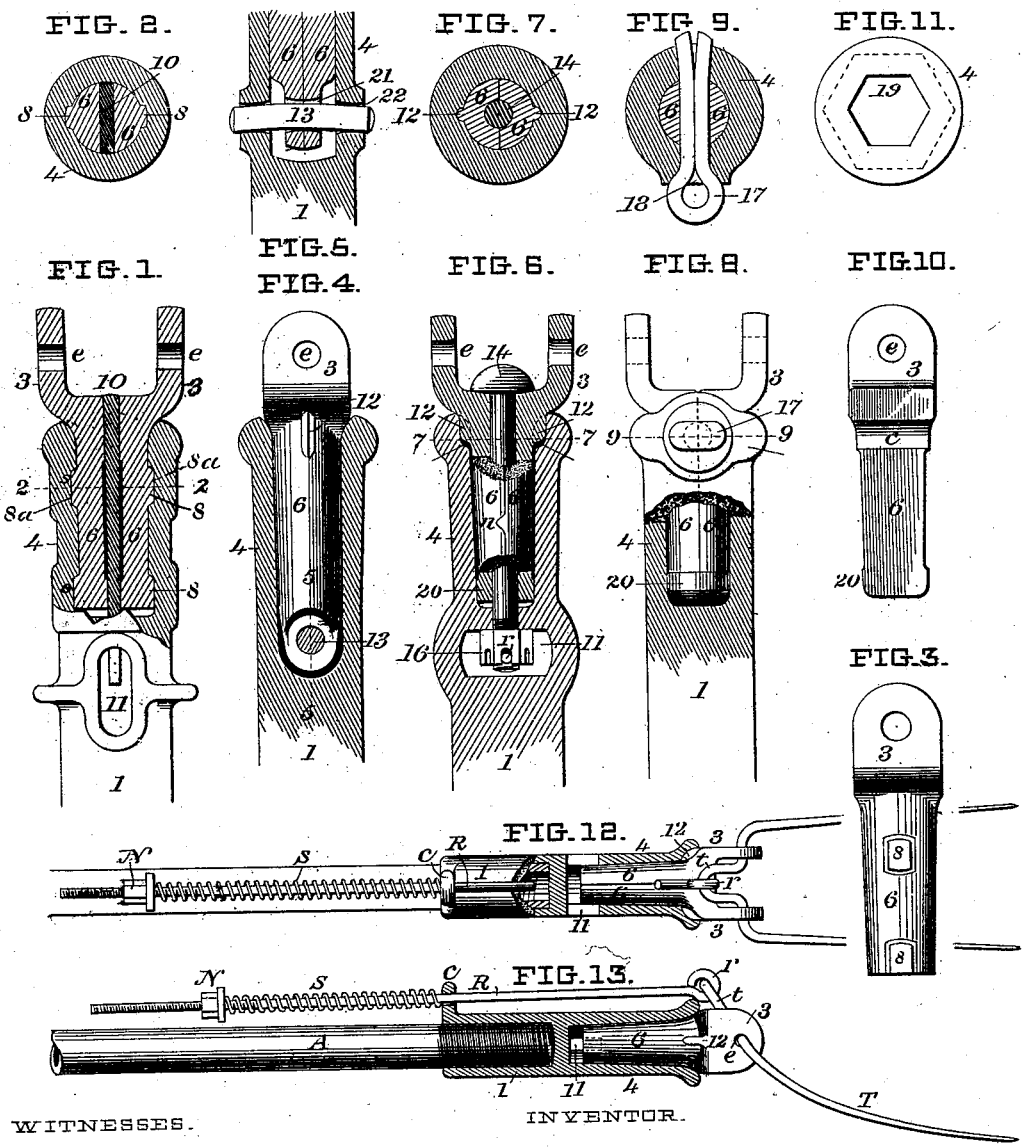

No. 756,062. PATENTED MAR. 29, 1904.
W. W. SHAW.
FORK HEAD FOR HAY TEDDERS.
APPLICATION FILED JAN. 16, 1903.
NO MODEL. 2 SHEETS—SHEET 2.

WITNESSES,
Charles H. Houghton.
Geo. D. Howard.

INVENTOR,
WILLIAM W. SHAW.
BY HIS ATTORNEY,
Franklin Scott.

THE NORRIS PETERS CO., PHOTO-LITHO., WASHINGTON, D. C.

No. 756,062. Patented March 29, 1904.

UNITED STATES PATENT OFFICE.

WILLIAM W. SHAW, OF HOOSICK FALLS, NEW YORK, ASSIGNOR OF ONE-HALF TO WATSON M. HOLMES, OF HOOSICK FALLS, NEW YORK.

FORK-HEAD FOR HAY-TEDDERS.

SPECIFICATION forming part of Letters Patent No. 756,062, dated March 29, 1904.

Application filed January 16, 1903. Serial No. 139,273. (No model.)

*To all whom it may concern:*

Be it known that I, WILLIAM W. SHAW, of the village of Hoosick Falls, in the county of Rensselaer and State of New York, have invented certain new and useful Improvements in Fork-Heads for Hay-Tedders, of which invention the following description, in connection with the accompanying sheet of drawings, constitutes a specification.

The invention is applicable to that class of hay-tedders in which the "grasshopper" movement of the forks is employed and spring-actuated tines are used; and it relates to improvements in the tine-bearings and in their mode of attachment to the fork-arm.

Hay-tedder forks are commonly made from a single piece of steel by bending the tines in proper shape, turning a bend at the shoulder of each tine where the fork is journaled in bearings, and providing a rearwardly-extending eye or loop back of the shoulders for the attachment of an actuating-spring. When the points of the tines catch the ground or an obstacle, they turn back, thus revolving in their bearings and by such movement straining the spring, and when the points become released the spring retracts suddenly, thus throwing the fork and contents violently forward or outwardly. By such usage the tines often get broken and it becomes necessary to replace a broken one by a new one. To facilitate this operation, it has become customary to make a separable cheek-piece with a hole through it for the tine-bearing and rivet these cheeks to the sides of an arm after the tines have been inserted in place. Bolts have been found unsuited for fastening these cheeks to the arm, for the shocks and strains to which the apparatus is subjected in use have been found to wear and loosen the bolts so that they would give way and the whole connection would become loose and breakages would soon follow. Hence rivets have been substituted for the purpose; but rivets do not fully meet all requirements, for if a fork breaks a new one cannot be substituted for the broken one without resorting to a shop or other facilities for cutting the rivets, so as to detach one of the cheeks, and substituting new rivets. All this involves loss of time, loss of rivets, and considerable expense.

The object of this invention, among other things, is to so modify the design of the cheeks as to retain the integral tine-bearing and at the same time provide a retaining-fastening for the same of a character which will remain in firm adjustment after connection has been made and yet will permit of easy disconnection to replace a broken fork.

To this end I have shown several modifications of my invention, all constructed upon the same general principles, but varying slightly in details which are non-essentials.

My invention relates to improvements in the following elements of a hay-tedder fork and arm—viz., the arm-socket, the cheeks which afford bearings for the fork-tines, means for locking or fastening the cheeks to the arms, means for binding the cheeks tightly in place, (the latter two may be embodied in the same device,) and incidentally, but not essentially, means for holding the cheeks in correct relative position termed a "coördinating" device.

Throughout the drawings all parts designated by the same letter or numeral perform identical functions and are regarded as equivalents of each other.

The several figures will be separately described, and the invention as therein embodied will be pointed out.

Figure 1 shows an axial longitudinal section of a tedder-arm and cheeks, taken on a plane passing through the tine-bearings of the cheeks; and Fig. 2 is a transverse section of the same, taken on the line 2 2 of Fig. 1. Fig. 3 shows a side view of one of the cheeks seen in Fig. 1. The arm 1 may be either solid or tubular, or a pipe may be used for that purpose. This arm terminates in a socket 4, which may be either straight or tapering; but the tapered form is preferred and is here shown. The cheeks 3 3 are fitted with the tine-bearings $e$ $e$, and each has a shank 6 fitted to the socket 4. In this case the shanks are so made that when inserted in place enough space will be left between them for the binding device 10, which is a key made long enough for its point to reach into the opening 11 of the arm. The socket has recesses 8ª 8ª, and the cheeks 3 have corresponding projections 8 8, which fit therein and conjointly form the locking device for preventing the withdrawal of the shanks from the socket. This combination is used by slipping one of the cheeks over each fork-tine so that the bearing *e* comes over the shoulder of the tine. Then the two cheeks are brought together side by side and dropped into the socket and the bosses 8 8 entered in the recesses 8ª 8ª. The key 10 is then driven between them down, so that its point enters the space 11. This operation distends the shanks sidewise firmly, while the bosses prevent forward withdrawal of the cheeks, and the key binds and holds them against loosening. The combination may be dissolved by driving a small key through hole 11 and starting key 10 out, when it may be withdrawn and the whole assemblage will fall apart, so that each cheek may be separated from the tine which passed through it. This is a combination of socket, cheeks, lock, and binder. The bosses and recesses preserve also relative adjustment of the two cheeks.

The modification shown in Figs. 4 and 5 is strictly analogous to the former. In this the socket is smooth on the interior and so are the sides of the shanks 6 6. Each cheek, however, is bored at its bottom end, as at 21, and the socket, as at 22, Fig. 5, for the reception of a binding and locking pin 13. The hole in the socket and the holes in the shanks are slightly offset, so that the driving in of the pin will draw the shanks down toward the bottom of the socket. This will cause the pin to yield or bend slightly, but will securely hold the parts in firm connection. When assembled, the pin 13 will both lock, bind, and coordinate the position of the cheeks; but as an aid in assembling the parts I have provided on each cheek a short rib 12, which takes into a corresponding nick in the rim of the mouth of the socket, as seen in Fig. 7, which will insure the holes at the bottom of the socket coming fair with those of the cheeks to receive the pin 13. This combination may be knocked down by simply driving out the pin 13 and is like that of Fig. 1.

Fig. 6 shows an axial longitudinal section of a socket and cheeks, and Fig. 7 a transverse section through the same, taken on the line 7 7 of Fig. 6. In this modification each cheek has a rib 12, which lets into a nick in the socket to locate the correct position of the cheeks in the socket and prevent rotation of the same therein and is longitudinally channeled for the reception of a bolt 14. This bolt passes through a diaphragm at the bottom of the socket into a hole or mortise 11 in the arm 1, where a nut is screwed on, as seen at 16, which is fastened by a pin *r*, which passes through one of the slits in the nut and a hole through the bolt. This secures the nut from getting loose. For convenience in assembling the parts the lug and nick *n* on the cheeks may be provided; but this is not an essential. These parts are assembled by slipping the cheeks over the tines and then inserting the shanks in the socket. The bolt 14 is then inserted and the whole driven down to a firm seat in the socket. Then the bolt is withdrawn sufficiently to put the nut 16 in position in hole 11, when it is run onto the point of the bolt, where it is set up with a wrench and the pin *r* inserted in place.

Fig. 8 is a partial longitudinal and Fig. 9 a cross section, taken on the line 9 9 of Fig. 8, of another modification of my invention; and Fig. 10 is an inside view of one of the cheeks thereof. This construction is similar to that shown in Fig. 6, except that the locking device consists of a cotter-pin 17, which is passed through the socket and cheeks near the head and in the same plane as the faces of the cheeks, which are recessed, as at *c*, for that purpose. The cotter-holes through the socket and cheeks of this modification are slightly offset in the same manner as is seen in Fig. 5, so that the insertion of the pin draws the cheek-tangs firmly down into the socket.

Fig. 11 illustrates means for preventing rotation of the cheek-shanks in the socket by making them of prismatic form, as shown at 19.

Figs. 12 and 13 represent partial horizontal and vertical longitudinal sections, respectively, of a cast socket attached to an arm made from a pipe or tube. The tubular arm is shown at A and the socket-section at *l*¹. These are united by an ordinary pipe-coupling joint, as shown. The ribs 12 on the cheeks prevent rotation in the socket, and they may be driven out by a key driven through the mortise 11. In this modification nothing is provided to hold the cheeks in the socket but the expansive force of spring S, the tension of which is exerted normally in a backward direction. In practice this has been found sufficient to keep all the parts in proper working position, for if the fork is turned back so as to compress the spring when it expands on the fork being released the back throw of the connecting-rod R will act to drive the cheeks into the socket rather than to loosen them.

Figure 16:
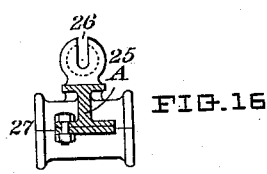
Figure 15:
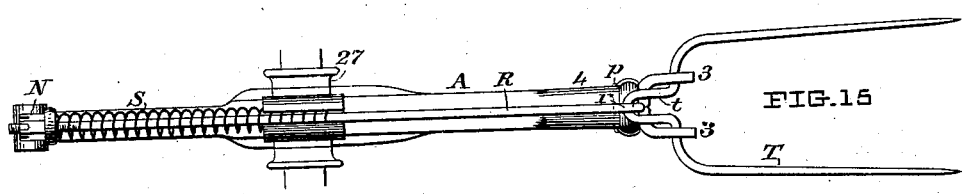
Figure 17:
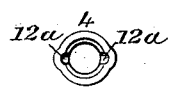

The preferable embodiment of my invention is shown in Figs. 14, 15, 16, and 17. Fig. 14 is a side view in partial vertical section, Fig. 15 is a top plan view, and Fig. 16 is a cross-section taken on the line 16 16 of Fig. 14 of this embodiment. Fig. 17 is a view of the open end of the socket of the arm. In this modification I employ a cast arm A, which oscillates on a fixed shaft on its bearing 27. In the fork end is the socket 4, in which are carried the shanks 6 of the cheeks 3 3. The bottom of the socket is mortised at 11 for admission of a key to drive out the cheeks. The cheeks have closed integral bearings for the tines, and each has a provision, as at 12, to prevent rotation of the cheeks in the socket and is perforated, as at $p'$, to receive a pin $p$, which passes through both socket and shanks of the cheeks. This pin-fastening is not provided from necessity, but to insure security in case of breakage or other accident which without it might permit the cheeks to be thrown out of the socket. A spring-socket 25 is provided near the middle of arm A, which is slit through its upper wall from end to end of the socket, as seen at Figs. 15 and 16. The connecting-rod R is fitted with a closed eye $r$, through which the fork-tine can be passed, as seen in Fig. 15, and its rear end is threaded to take on the adjusting-nut N. The spring S is held between the bottom of the spring-socket and the under side of the nut. The slit 26 serves an important function in affording special facilities for detaching a broken fork from its connections. In some existing machines a closed socket for the spring is used; but where this is the case the rod can only be detached from its connections by drawing it out through the hole in the head of the socket after the nut has been removed. This feature is a disadvantage.

My invention is used as follows: Assuming that the parts have been assembled as shown in Fig. 15 and a tine gets broken or a cheek-piece possibly; but this would be unusual. To unlimber the combination, remove the nut N and draw the spring S back out of the socket 25. Then the rod R may be lifted out of its position in the socket through the slit 26. Then if the cheeks are not loose enough in the socket 4 to be withdrawn with the hand drive a key or wedge through the opening 11 and start the cheeks out of the socket. Being withdrawn, each may be slipped off over the ends of the tines, when the fork may be drawn through and out of the eye $r$ of the rod R. A new fork may then be entered in the eye and passed through it until the bend $t$ is in position. Each of the cheeks may then be slipped over a tine and brought into position where the shanks 6 6 will meet each other, when the latter can be entered in the socket 4. The rod R may be dropped through the slit 26 into position in the spring-socket, after which the spring can be slipped over the rod and its end entered in the socket, the coils of the spring effectually locking the rod in its position in the socket, and the nut may then be run on the end of the rod and screwed down until the desired degree of tension is secured to give to the retroverted fork its proper kick when its points are released from the obstacle which turned it backwardly.

I therefore claim as my invention the following:

1. The combination in a hay-tedder of a fork-arm having a socket-head, two separable fork-holding cheek-pieces having shanks to fit said socket, a fork journaled in bearings in the cheek-pieces, a retracting-rod and an actuating-spring connected therewith, all combined and arranged to operate substantially as described.

2. The combination in a hay-tedder of a fork-arm having a tapering socket-head, two separate fork-holding cheek-pieces having shanks to fit said socket, a fork journaled in bearings in the cheek-pieces, a retracting-rod and an actuating-spring connected therewith, combined and arranged to operate substantially as described.

3. The combination in a hay-tedder of a fork-arm having a socket-head, two separate fork-holding cheek-pieces having shanks to fit said socket, an opening into said socket at its base to render the extremities of the shanks accessible, a fork journaled in bearings in the cheek-pieces, a retracting-rod and an actuating-spring connected therewith, all combined and arranged to operate substantially in the manner described and for the purposes set forth.

4. The combination in a hay-tedder of a fork-arm having a socket-head, two separable fork-holding cheek-pieces having shanks to fit said socket, a fork journaled in bearings in the cheek-pieces, a retracting-rod, an actuating-spring connected therewith, and means intermediate the rod and spring for controlling its tension, all combined and arranged to operate substantially as described.

5. A hay-tedder arm having a socket-head, two separate fork-holding cheek-pieces, each having a closed eye-bearing for the reception of a fork-tine and having shanks to fit said socket, means for confining the shanks within the socket, and means connected with the socket and shanks to prevent the shanks rotating within the socket, substantially as specified.

6. The combination in a hay-tedder of a fork-arm having a tapering socket-head, two separate fork-holding cheek-pieces having shanks to fit said socket, a fork journaled in bearings in the cheek-pieces, a retracting-rod, an actuating-spring connected therewith and means intermediate the rod and spring for controlling its tension, combined and arranged to operate substantially as described.

7. The combination in a hay-tedder of a fork-arm having a socket-head, two separate fork-holding cheek-pieces having shanks to fit said socket, an opening into said socket at its base to render the extremities of the shanks accessible, a fork journaled in the bearings in the cheek-pieces, a retracting-rod, an actuating-spring connected therewith, and means intermediate the rod and spring for controlling its tension, combined and arranged to operate substantially in the manner described and for the purposes specified.

8. The combination with a hay-tedder fork-arm, of the slotted spring-socket, retracting-rod, spring and means intermediate the rod and spring for holding the assembled parts in operative connection, substantially as specified.

9. The combination with the hay-tedder fork-arm, of the slotted spring-socket, retracting-rod and nut, and spring, arranged to operate substantially as specified.

10. As an improved adjunct to a hay-tedder fork-arm, a spiral spring-socket of a caliber adapted to receive the end of a spiral spring, having one end open for the insertion endwise of the spring and the opposite end closed to form an abutment-seat for the end of the spring, the wall of the socket and its closed end being slotted for the passage of the rod, whereby on withdrawing the end of the spring from the socket the rod may be lifted out of the same through said slot, substantially as specified.

In testimony whereof I have hereto subscribed my name this 22d day of December, A. D. 1902.

WILLIAM W. SHAW.

In presence of—
FRANKLIN SCOTT,
EMILY SCOTT.